United States Patent
Jeong

(10) Patent No.: US 6,468,173 B1
(45) Date of Patent: Oct. 22, 2002

(54) SPROCKET ASSEMBLY FOR SILENT TIMING CHAIN SYSTEM

(75) Inventor: Yeon-Man Jeong, Kwangmyung (KR)

(73) Assignees: Hyundai Motor Company, Seoul (KR); Kia Motors Corporation, Kwangmyung (KR)

( * ) Notice: Subject to any disclaimer, the term of this patent is extended or adjusted under 35 U.S.C. 154(b) by 0 days.

(21) Appl. No.: 09/624,560

(22) Filed: Jul. 25, 2000

(30) Foreign Application Priority Data

Sep. 10, 1999 (KR) .............................. 99-38585

(51) Int. Cl.$^7$ ........................ F16H 55/30; F16H 55/16
(52) U.S. Cl. ..................... 474/158; 474/161; 464/77
(58) Field of Search .......................... 474/95, 96, 97, 474/85, 100, 151, 150, 159, 152, 161, 171, 162, 163; 464/77

(56) References Cited

U.S. PATENT DOCUMENTS

| | | | | |
|---|---|---|---|---|
| 2,659,220 A | * | 11/1953 | Cherry | 474/158 X |
| 3,220,273 A | * | 11/1965 | Christian | 474/162 |
| 3,487,706 A | * | 1/1970 | Resener | 474/158 |
| 4,043,214 A | * | 8/1977 | Westlake | 474/162 |
| 4,175,796 A | * | 11/1979 | Boggs et al. | 305/115 |
| 4,261,214 A | * | 4/1981 | Watanabe et al. | 474/161 X |
| 5,316,524 A | * | 5/1994 | Wong et al. | 474/151 |
| 6,267,701 B1 | * | 7/2001 | Mott | 474/164 |

* cited by examiner

Primary Examiner—Charles A Marmor
Assistant Examiner—Ha Ho
(74) Attorney, Agent, or Firm—Christie, Parker & Hale, LLP

(57) ABSTRACT

A sprocket assembly for an automotive timing chain system includes a main sprocket, an auxiliary sprocket mounted onto one side of the main sprocket for assisting the main sprocket, and an elastic member elastically coupling the auxiliary sprocket to the main sprocket for generating an elastic force between the main and auxiliary sprockets.

6 Claims, 5 Drawing Sheets

SPROCKET ASSEMBLY FOR SILENT TIMING CHAIN SYSTEM

BACKGROUND OF THE INVENTION (a) Field of the Invention

The present invention relates to a timing chain system, and in particular, to an improved sprocket assembly for an automotive timing chain system capable of reducing noise.

(b) Description of the Related Art

As well known, internal combustion engines employ poppet valves that are operated by a camshaft that is driven by a crankshaft, with a suitable timing mechanism, and timing chains are used to transmit power and motion between the camshaft and the crankshaft. These chains are formed of ranks of links interleaved with adjacent ranks of links and having aligned apertures for receiving pivot pins to join the ranks and provide articulation of the chain as it passes around the driving and driven sprockets.

FIG. 1 shows a conventional internal combustion engine embodying a timing chain and sprocket system.

As shown in FIG. 1, a driving sprocket 51 on the crankshaft 60 and the driven sprocket 52 on the camshaft 61 are connected to each other by a timing chain 53. The sprockets 51 and 52 have a plurality of teeth 62 equally spaced around the circumference of the driving and driven sprockets 51 and 52, and the timing chain 53 consists of pairs of inside links 54 alternating with pairs of flanking guide links 65 joined by pivot pins 55 insulated by rollers 56 such that the chain 53 engages the driving and driven sprockets 51 and 52.

The tension of the timing chain 53 is adjusted by a damper 58 and a tension device 59 mounted to an engine block.

In this configuration, the engine torque is transmitted to the drive sprocket 52 via the crankshaft 60 and consequently to the driven sprocket 52 on the camshaft 61 by the chain 53 such that the camshaft 61 rotates so as to operate a valve system.

FIG. 2 is an enlarged view of a camshaft sprocket engaged with the chain. As shown in FIG. 2, the chain 53 wraps on the sprocket 52 in a way that the pivot pins 55 having rollers 56 are inserted between the teeth 62 such that the teeth on the sprocket act to transfer a load from the chain 53.

In this timing chain system, however, the friction surface between the rollers 56 insulating the pivot pins 55 and the driven sprocket 52 is large so backlash is generated, and in particular there exists a gap "C" between the pivot pin 55 and the roller 56 such that vibration noise is caused by engine resonance. Also, the rollers 56 generate noise when they contact the sprocket 52.

SUMMARY OF THE INVENTION

The present invention has been made in an effort to solve the above problems of the prior art.

It is an object of the present invention to provide an improved sprocket for a timing chain system allowing a reduction in backlash between the chain and the sprocket by integrally forming an auxiliary sprocket with the driving and driven sprockets, resulting in a reduction of noise.

It is another object of the present invention to provide an improved sprocket for a timing chain system capable of preventing vibration noise from between the pivot pin and the roller from being generated by integrally forming an auxiliary sprocket with the driving and driven sprockets.

To achieve the above object, a sprocket assembly for an automotive timing chain system comprises a main sprocket, an auxiliary sprocket mounted onto one side of the main sprocket for assisting the main sprocket, and an elastic member elastically coupling the auxiliary sprocket to the main sprocket for generating an elastic force between the main and auxiliary sprockets.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
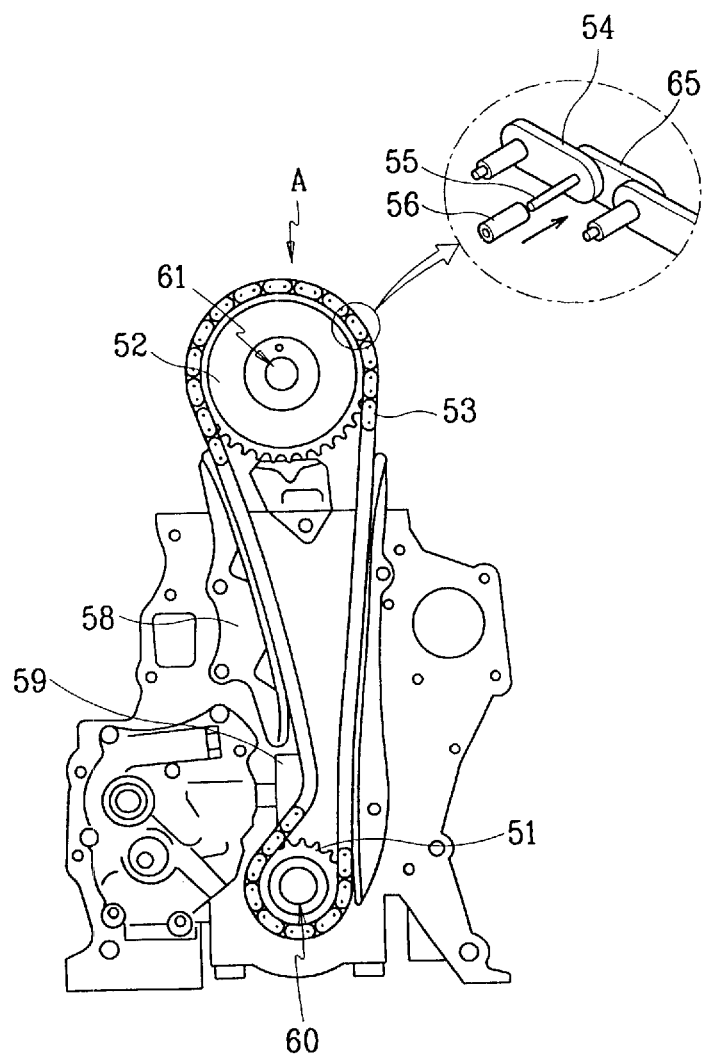
FIG. 1 is a front view showing an engine equipped with a prior art timing chain system.
Figure 2:
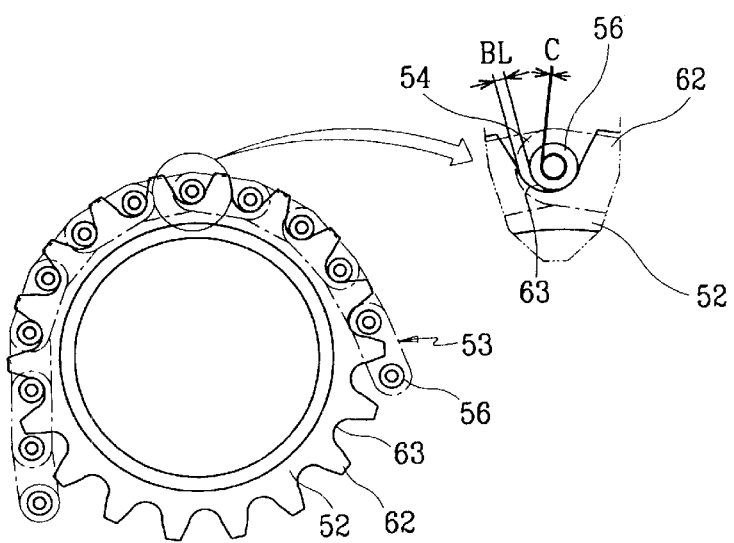
FIG. 2 is a partially enlarged view showing a driven sprocket engaged with a chain of the timing chain system of FIG. 1.
Figure 3:
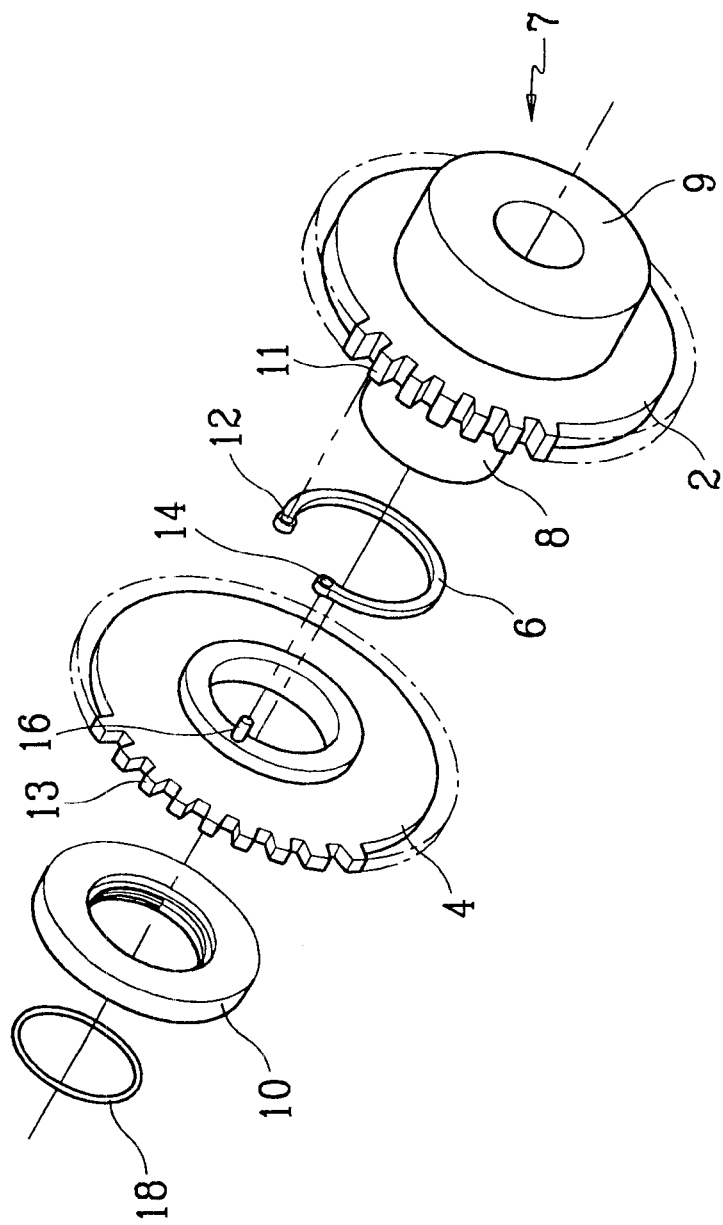
FIG. 3 is an exploded perspective view showing a sprocket according to the preferred embodiment of the present invention.
Figure 4:
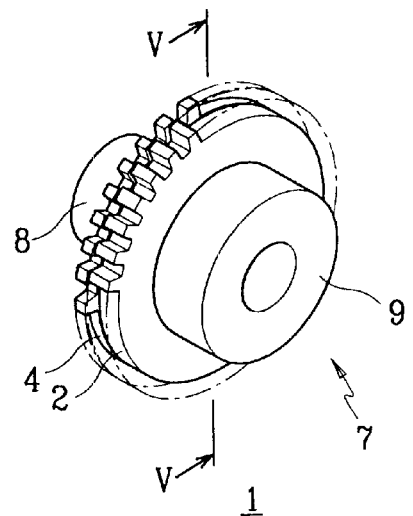
FIG. 4 is an assembled perspective view showing the sprocket of FIG. 3.
Figure 5:
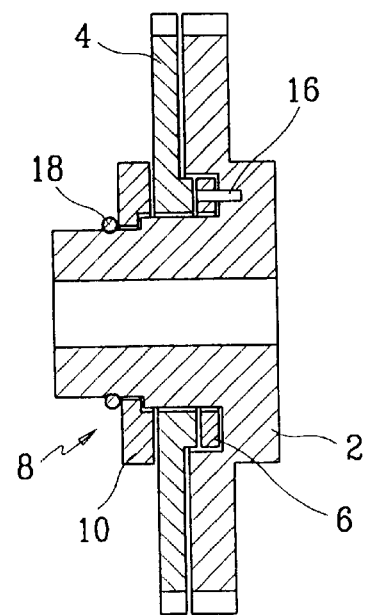
FIG. 5 is a cross sectional view cut along the line V—V of FIG. 4.

FIG. 3 and FIG. 4 respectively show an exploded and an assembled driven sprocket according to the preferred embodiment of the present invention. FIG. 5 is a cross sectional view cut along the line V—V of FIG. 4. Since the sprocket assembly of the present invention can be adapted to the conventional chain system, the prior art reference numerals will be used for the same elements.

As shown in FIG. 3 and FIG. 4, the sprocket assembly 1 comprises a main sprocket 2, an auxiliary sprocket 4 mounted on one side of the main sprocket 2, and a ring spring 6 installed between the main sprocket 2 and the auxiliary sprocket 4 for elastically connecting the main and the auxiliary sprockets 2 and 4.

The main sprocket 2 is provided with a hub 7 that extends on either side of a central portion thereof. The hub is formed having first and second extenders 8 and 9 in which an exterior diameter of the first extender 8 is smaller than that of the second extender 9, and an opening for fixedly receiving a camshaft (not shown). 4)

The auxiliary sprocket 4 is provided with a flanged opening at its central portion so as to be mounted on the first extender 8 of the hub 7, and it has the same tooth profile as the main sprocket 2.

In addition, the main and auxiliary sprockets 2 and 4 are each provided with a pin 16 fixed on the surface facing the other sprocket.

The ring spring 6 is designed as an open ring with pin holes 12 and 14 in free ends thereof such that the ring spring 6 is installed between the main sprocket 2 and the auxiliary sprocket 4 by inserting the respective pins 16 into the pin holes 12 and 14.

After the auxiliary sprocket 4 is coupled with the main sprocket 2, a fixing member 10 is screwed on the extender 8 and a fixing ring 18 is then fixed thereon.

The sprockets 2 and 4 can turn relative to each other by as much as one sprocket tooth when not engaged with the chain, such that the ring spring 6 connecting the main and auxiliary sprocket 2 and 4 to each other extends so as to cause an elastic force therebetween when they are engaged with the chain.

The operation of the sprocket assembly according to the preferred embodiment of the present invention will be described hereinafter with reference to FIG. 6.

Figure 6:
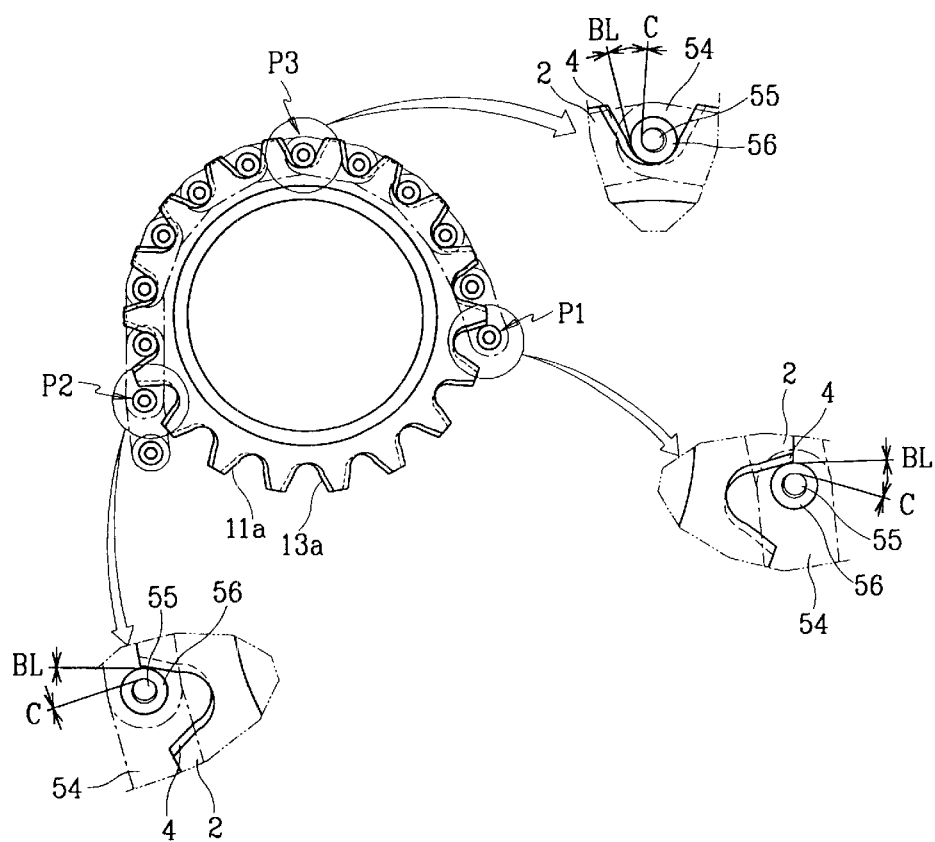
FIG. 6 is an operational view showing a driven sprocket engaged with the chain according to the preferred embodiment of the present invention.

FIG. 6 is an operational view showing a driven sprocket engaged with the chain.

As shown in FIG. 6, the main and auxiliary sprockets 2 and 4 are rotationally coupled to each other by means of the ring spring 6 (see FIG. 5), and while engaged with the chain 53 with a one sprocket tooth rotational preload the auxiliary sprocket 4 rotates relative to the main sprocket 2 such that the main and auxiliary sprockets 2 and 4 generate a displacement to each other by the elastic force of the ring spring 6 to the limitation of two neighboring pivot pins 55 of the chain 53. Accordingly, a main sprocket tooth flank 11a and the auxiliary tooth flank 13a contact opposite sides of the rollers 56 of the chain 53 such that the rollers 56 are fitted between the main sprocket teeth 11 and the auxiliary sprocket teeth 13 of FIG. 3.

That is, the chain 53 starts engaging with the sprocket assembly 1 by the back flank of the auxiliary sprocket tooth 13 contacting the roller 56 of the chain 53 at the engaging portion P1, and it disengages from the sprocket assembly 1 by the front flank of the main sprocket tooth 11 breaking contact with the roller 56 of the chain at the disengaging portion P2.

As a result, the vibration caused by the gap C between the pivot pin 55 and the roller 56 surrounding it is absorbed by the sprocket assembly 1 while fitting the rollers 56 to the main and auxiliary sprocket teeth 11 and 13.

Also, at a completely engaged portion P3, backlash between the main sprocket 2 and the roller 56 is avoided because the auxiliary sprocket tooth 13 supports the roller 56 such that the freeplay between the roller 56 and the sprocket assembly 1 is absorbed and metallic noise caused by the freeplay is obviated. At the same time, the vibration noise caused by the gap C between the roller 56 and the pivot pin 55 is also prevented because the auxiliary sprocket tooth 13 pushes the roller against the pivot pin 55.

Although the sprocket assembly of the present invention has been described in use on the camshaft, it can be adapted to a driving sprocket on a crankshaft as well.

As described above, in the sprocket assembly according to the preferred embodiment of the present invention, the auxiliary sprocket is elastically connected to the main sprocket by means of the ring spring, which allows the main and auxiliary sprockets to turn relative to each other such that the displacement between the main sprocket tooth and the auxiliary sprocket tooth caused by the elastic force of the ring spring avoids generation of backlash, and results in avoidance of freeplay noise generated when the roller contacts the sprocket tooth, particularly the tooth flank. Furthermore, since the auxiliary sprocket tooth pushes the roller against the pivot pin, vibration noise caused by the gap C between the roller and the chain is also prevented.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A sprocket assembly for an automotive timing chain system comprising:

a main sprocket comprising a first hub;

an auxiliary sprocket mounted onto one side of the main sprocket for assisting the main sprocket;

an elastic member elastically coupling the auxiliary sprocket to the main sprocket for generating an elastic force between the main and auxiliary sprockets; and a fixing member threaded onto the first hub after the auxiliary sprocket is coupled with the main sprocket and a fixing ring subsequently fixed therearound.

2. A sprocket assembly of claim 1 wherein the auxiliary sprocket comprises a tooth profile identical to that of the main sprocket.

3. A sprocket assembly of claim 1 wherein the main and auxiliary sprockets can rotate relative to each other by as much as one sprocket tooth while not engaged with a timing chain, so as to maintain a rotational elastic preload between the main and auxiliary sprocket while engaged with the chain.

4. A sprocket assembly of claim 1 wherein the first hub extends on one side of a central portion of the main sprocket and wherein the main sprocket comprises a second hub that extends on the other side of the central portion of the main sprocket.

5. A sprocket assembly of claim 4 wherein a diameter of the first hub is smaller than that of the second hub.

6. A sprocket assembly of claim 4 wherein the auxiliary sprocket is rotationally mounted onto the first hub.

* * * * *